United States Patent
Chen

(10) Patent No.: US 7,324,693 B2
(45) Date of Patent: Jan. 29, 2008

(54) METHOD OF HUMAN FIGURE CONTOUR OUTLINING IN IMAGES

(75) Inventor: Shoupu Chen, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 931 days.

(21) Appl. No.: 10/421,428

(22) Filed: Apr. 23, 2003

(65) Prior Publication Data

US 2004/0213460 A1 Oct. 28, 2004

(51) Int. Cl.
*G06K 9/00* (2006.01)

(52) U.S. Cl. ............... 382/199; 382/118; 382/103; 382/203; 382/117

(58) Field of Classification Search ............... 382/103, 382/118, 199, 266, 203, 117
See application file for complete search history.

(56) References Cited

U.S. PATENT DOCUMENTS

| 6,661,907 B2* | 12/2003 | Ho et al. ............... 382/118 |
| 6,674,902 B1* | 1/2004 | Kondo et al. ............... 382/199 |
| 7,035,456 B2* | 4/2006 | Lestideau ............... 382/164 |
| 2004/0247183 A1* | 12/2004 | Molander ............... 382/209 |

FOREIGN PATENT DOCUMENTS

EP 1 215 618 A2 6/2002
EP 1 296 279 A2 3/2003

OTHER PUBLICATIONS

Huitao Luo et al., "Rubberband: An Improved Graph Search Algorithm For Interactive Object Segmentation," Proc. of ICIP, 2002.
David Hogg, "Model-Based Vision: A Program To See A Walking Person," Image and Vision Computing, vol. 1, No. 1, Feb. 1983, pp. 5-20.
S. Ioffe et al., "Probabilistic Methods For Finding People," International Journal of Computer Vision 43(1), pp. 45-68, 2001.
D. A. Forsyth et al., "Automatic Detection of Human Nudes," International Journal of Computer Vision 32(1),pp. 63-77, 1999.
Eric N. Mortensen, et al., "Intelligent Scissors For Image Composition," Computer Graphics Proceedings, Annual Conference Series, pp. 191-198, 1995.

(Continued)

Primary Examiner—Bhavesh M Mehta
Assistant Examiner—John B Strege
(74) Attorney, Agent, or Firm—Stephen H. Shaw

(57) ABSTRACT

A digital image processing method for automatically outlining a contour of a figure in a digital image, including: testing parameters of a region within the digital image according to a plurality of cascaded tests; determining whether the region contains characteristic features of the figure within the digital image; computing location parameters of the characteristic features in the region for the figure within the digital image; determining boundary parameters for the figure corresponding to the location parameters of the characteristic features in the region; computing an information map of the digital image; computing a set of indicative pixels for the contour of the figure; and automatically outlining the contour of the figure using the set of indicative pixels, the information map, and a contour outlining tool.

38 Claims, 4 Drawing Sheets

OTHER PUBLICATIONS

Michael Kass, et al., "Snakes: Active Contour Models," Proceedings of the First International Conference on Computer Vision, pp. 259-268, 1987.

Myron Flickner, et al., "Intelligent Interactive Image Outlining Using Spline Snakes," Prox. 28th Asilomar Conf. on Signals, Systems, and Computers, vol. 1, pp. 731-735, 1994.

Alvin R. Tilley, "The Measure Of Man And Woman," John Wiley & Sons, INC. 2001.

E. W. Dijkstra, "A Note On Two Problems In Connexion With Graphs," Numeriche Mathematik, vol. 1, pp. 269-270, 1959).

S. Ioffe, et al., "Probabilistic Methods For Finding People," International Journal of Computer Vision 43(1), pp. 45-68, 2001.

* cited by examiner

METHOD OF HUMAN FIGURE CONTOUR OUTLINING IN IMAGES

FIELD OF THE INVENTION

The present invention relates to a digital image processing method for automatically outlining a contour of a figure in a digital image. Specifically, the present invention relates to employing a contour outlining tool with region detectors and a cost map to outline a contour of a figure in a digital image

BACKGROUND OF THE INVENTION

Detection of people in images or videos has been of interest in recent years in computer vision, image understanding, and image processing communities for various applications. The problem of detecting people is a very challenging one due to the fact that there are practically unlimited variations in configurations and appearances of human figures, particularly in terms of color, posture, and texture.

In the past, researchers have explored people detection mainly using motion information or explicit models (see "Model-Based Vision: A Program to See a Walking Person," by David Hogg, Image and Vision Computing, Vol. 1, No. 1, February 1983, pp. 5-20).

In recent years, benefiting from the advances in pattern recognition theory, there has been a shift of interest to using object classification approaches for people detection in static images (see "Probabilistic Methods for Finding People," by S. Ioffe and D. A. Forsyth, International Journal of Computer Vision 43(1), pp. 45-68, 2001). Methods using human body parts configuration structural analysis are also reported recently in the publication "Automatic Detection of Human Nudes," by D. A. Forsyth and M. M. Fleck in International Journal of Computer Vision 32(1), pp. 63-77, 1999.

However, there is no published work that tackles the problem of automatically outlining human body contours in conjunction with people detection in photographic images.

Outlining a human figure contour is basically an optimal boundary detection problem. Among the global boundary based techniques, graph searching and dynamic programming are popular techniques used to find a globally optimal boundary based on some local cost criteria. Mortensen and Barrett proposed, in 1995, an interactive tool called Intelligent Scissors which they used for image segmentation (see "Intelligent Scissors for Image Composition," by Eric N. Mortensen, and William A. Barrett, Computer Graphics Proceedings, Annual Conference Series, pp. 191-198, 1995). The Mortensen and Barrett scheme is basically a semi-automatic object contour extraction method that allows a user to enter his knowledge of the image and leave the algorithm to quickly and accurately extract object boundaries of interest. In comparison with the popular snakes or active contour models (see "Snakes: Active Contour Models," by Michael Kass et al., in Proceedings of the First International Conference on Computer Vision, pp. 259-268, 1987), the Intelligent Scissors can be regarded as a 'non-parametric' boundary finding algorithm.

Snakes were introduced as an energy minimizing splines guided by external and internal forces. Snakes are interactively initialized with an approximate boundary contour; subsequently this single contour is iteratively adjusted in an attempt to minimize an energy functional. Formally, snakes are curves that minimize an energy functional with a term for the internal energy of the curve and a term giving external forces to the curve. The internal energy consists of curve bending energy and curve stretching energy. The external forces are linked to the gradient of the image causing the snake to be drawn to the image's edges. In the Kass et al. paper, snakes are numerical solutions of the Euler equations for a functional minimization problem. In the work done by Flikner et al. they converted the snake problem into a parameter estimation problem (see "Intelligent Interactive Image Outlining Using Spline Snakes," by Myron Flickner et al., Proc. 28th Asilomar Conf. on Signals, Systems, and Computers, Vol. 1, pp. 731-735, 1994).

The original Intelligent Scissors tool is interactively initialized with just a single seed point and it then generates, at interactive speeds, all possible optimal paths from the seed to every other point in the image. Thus, the user is allowed to interactively select the desired optimal boundary segment. As a result, Intelligent Scissors typically requires less time and effort to segment an object than it takes to manually input an initial approximation to an object boundary.

Snakes are globally optimal over the entire curve whereas the Intelligent Scissors boundaries are piece-wise optimal (i.e., optimal between seed points); thus, creating a desirable balance between global optimality and local control. The Intelligent Scissors outperforms the snakes in outlining object boundaries having arbitrary shapes.

It is useful to design a system that can reliably and automatically outline a human figure contour with good precision. This kind of system can be used, for example, in image composition.

There is a need, therefore, for an improved people detection system that overcomes the problems set forth above. Specifically, there is a need to remove the user interaction of outlining a figure's contour and/or edge boundary.

These and other aspects, features and advantages of the present invention will be more clearly understood and appreciated from a review of the following detailed description of embodiments and appended claims, and by reference to the accompanying drawings.

SUMMARY OF THE INTENTION

The above need is met according to the present invention by providing a digital image processing method for automatically outlining a contour of a figure in a digital image, including: testing parameters of a region within the digital image according to a plurality of cascaded tests; determining whether the region contains characteristic features of the figure within the digital image; computing location parameters of the characteristic features in the region for the figure within the digital image; determining boundary parameters for the figure corresponding to the location parameters of the characteristic features in the region; computing an information map of the digital image; computing a set of indicative pixels for the contour of the figure; and automatically outlining the contour of the figure using the set of indicative pixels, the information map, and a contour outlining tool.

ADVANTAGES

The present invention has the advantage of automatically finding the boundary of a figure in an image without user input.

DETAILED DESCRIPTION OF THE INVENTION

Figure 1:
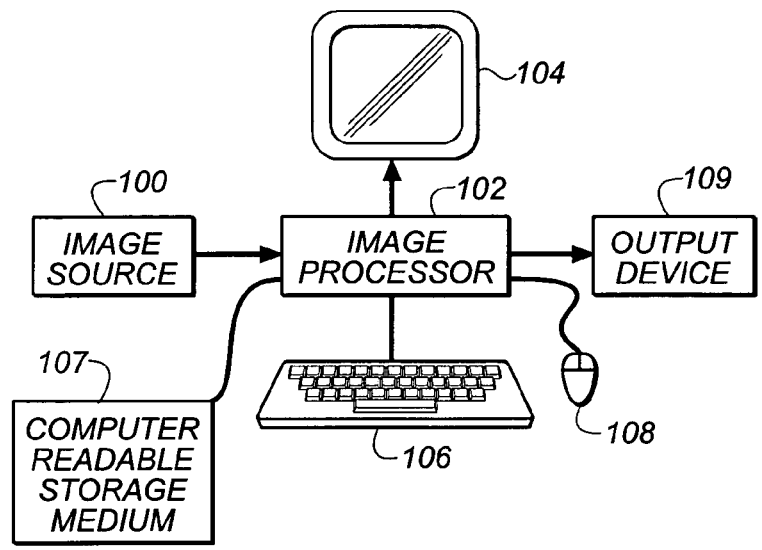
FIG. 1 is a schematic diagram of an image processing system useful in practicing the present invention.

FIG. 1, shows an image processing system useful in practicing the present invention including a color digital image source 100, such as a film scanner, digital camera, or digital image storage device such as a compact disk drive with a Picture CD, or other image storage devices for digital images, such as servers, or wireless devices. The digital image from the digital image source 100 is provided to an image processor 102, such as a programmable personal computer, or digital image processing work station such as a Sun Sparc™ workstation. The image processor 102 may be connected to a CRT image display 104, an operator interface such as a keyboard 106 and a mouse 108. Image processor 102 is also connected to computer readable storage medium 107. The image processor 102 transmits processed digital images to an output device 109. Output device 109 can comprise a hard copy printer, a long-term image storage device, a connection to another processor, or an image telecommunication device connected, for example, to the Internet, or a wireless device.

In the following description, one preferred embodiment of the present invention will be described as a method. However, in another embodiment, the present invention comprises a computer program product for detecting human faces in a digital image in accordance with the method described. In describing the present invention, it should be apparent that the computer program of the present invention can be utilized by any well-known computer system, such as the personal computer of the type shown in FIG. 1. However, many other types of computer systems can be used to execute the computer program of the present invention. For example, the method of the present invention can be executed in the computer contained in a digital camera or a device combined or inclusive with a digital camera. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Other aspects of such algorithms and systems, and hardware and/or software for producing and otherwise processing the images involved or co-operating with the computer program product of the present invention, are not specifically shown or described herein and may be selected from such algorithms, systems, hardware, components, and elements known in the art.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware.

Figure 7:
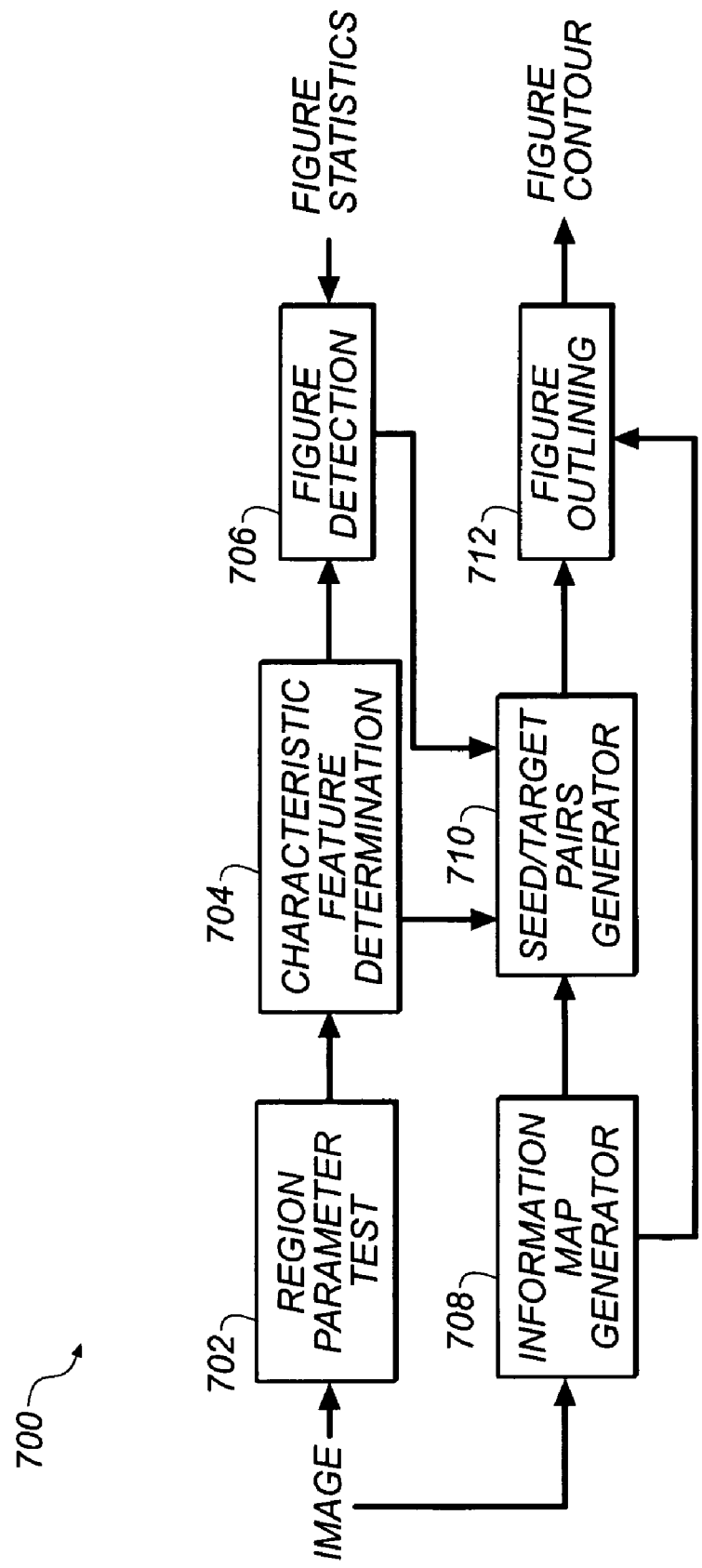
FIG. 7 is a flowchart illustrating the figure contour outlining method according to the present invention.

Now referring to FIG. 7, the method of the present invention is illustrated. FIG. 7 is a flowchart 700 illustrating the general figure contour outlining method according to the present invention. A first task is to find the figure or figures in the image. A second task is to outline contours of the figures. The first task in this method is accomplished by using a region parameter test 702, a characteristic feature determination 704 and a figure detection process 706. The region parameter test 702 finds a part or parts of a figure through methods such as template matching or correlation testing. Templates of the part or parts of the figure can be trained through algorithms such as supervised statistical learning. The characteristic feature determination 704 extracts distinct point or points from the tested region. The point or points have statistically meaningful relation to the figure to be outlined. With the help of the determined point or points and a prior knowledge (statistics) of the figure, some key boundary locations of the figure can be deduced in the operation of figure detection 706. The second task is tackled by using the Intelligent Scissors introduced above, aided with the parameters deduced from the characteristic feature determination 704 and key boundary locations of the figure in figure detection 706. The parameters deduced from the characteristic feature determination 704 and key boundary locations from figure detection 706 are used to generate pairs of seed and target points in an operation of seed/target pixel pairs generator 710. These seed and target pixel pairs are indicative and must be on or very close to edges of the figure(s) in the image. The edges of the figure(s) can be obtained through a gradient operation applied to the entire image pixels. The edges of the figure(s) can also be obtained through background and foreground (that is, the figures) separation using techniques such as color segmentation. The exemplary gradient operation and color segmentation could be intermediate results of the operation of information map generator 708. The information map generator 708 could be computed, for example, using color entities. According to the present invention, the output of the information map generator 708 is a cost map or an energy map on which the operation of figure outlining 712 relies. The cost map could be computed using the gradient of the intensity values of the pixels of the image. With the cost map, the figure outlining operation 712 finds the minimum cost path from the seed to the target for a pair of seed and target points found in seed/target pixel pairs generation 710. The figure outlining operation 712 is conducted without user intervention, that is, the figure outlining operation 712 finds the path automatically based on seed and target pixel points and the information map. The technique used to compute the minimum cost path from seed to target is a modified Intelligent Scissors. The modified Intelligent Scissors approach in the present invention is to define a search band based on the location of seed and target pixel points. The modified Intelligent Scissors is to be detailed later.

Figure 4:
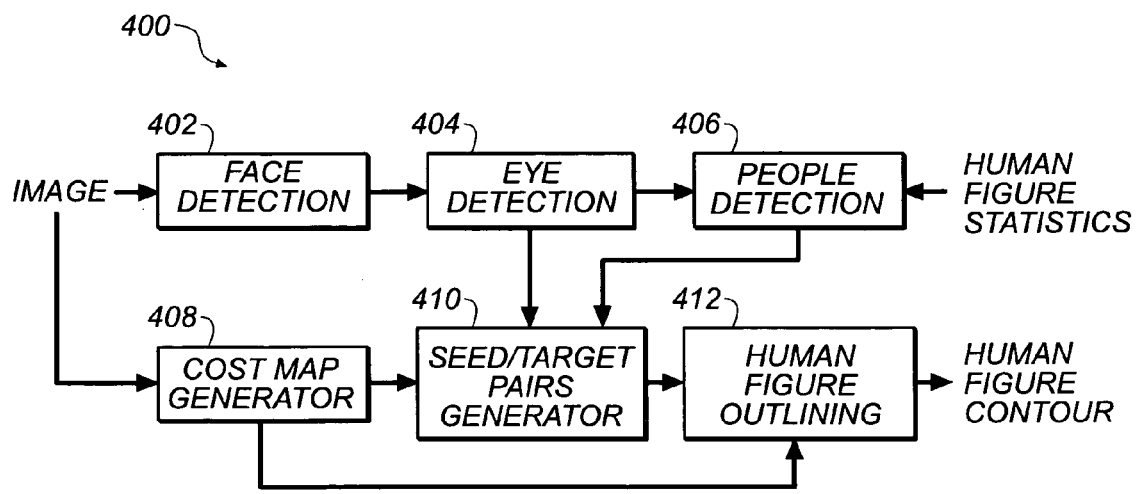
FIG. 4 is a flowchart illustrating the human figure contour outlining method according to the present invention.

Now referring to FIG. 4, the method of human figure contour outlining of the present invention is illustrated. FIG. 4 is a flowchart 400 illustrating the human figure contour outlining method according to the present invention. Two distinct tasks are involved in this method, locating a person and finding the contour of the located person. The first task in this method is, primarily, accomplished by using a face detection process 402 more fully described in commonly assigned, co-pending U.S. patent application Ser. No. 10/211,011, titled "Method For Locating Faces In Digital Color Images" filed Aug. 2, 2002, by Shoupu Chen et al., and which is incorporated herein by reference; eye detection processes 404 described in commonly assigned, co-pending U.S. Patent Publication No. 2002/0114495 A1, filed Dec. 19, 2000, titled "Multi-Mode Digital Image Processing Method For Detecting Eyes," and which is incorporated herein by reference; and statistics of human body measurement in "The Measure of Man and Woman" by Alvin R Tilley, John Wiley & Sons, INC. 2001. The second task is tackled by using the Intelligent Scissors introduced above, aided with the parameters deduced from the eye detection process 404 and parameters obtained from the people detection 406. Note that localization of persons in images can also be completed with other methods.

Face Detection

Figure 2:
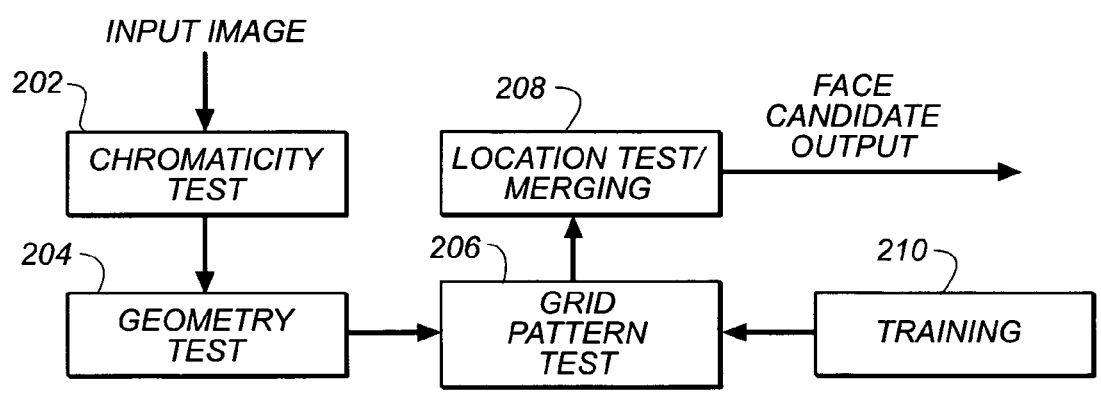
FIG. 2 is a flowchart illustrating the face detection method of the present invention.

In the present design, face detection 402, as shown in FIG. 4, is realized by using a multi-resolution/multi-scale grid pattern correlation method revealed in the co-pending U.S. patent application Ser. No. 10/211,011. The face candidate finding task is distributed to different types of tests. This distributed system approach reduces burdens on each individual test, thereby, speeding up the candidate finding process. FIG. 2 is a flow chart 200 illustrating the face candidate finding method according to the present invention. Each of these tests discards non-face objects with high confidence and retains most faces. The idea is to maintain a high true-positive candidate finding rate in every cascaded test, while keeping a relatively low false-positive rate for individual tests.

There are basically four cascaded tests shown in FIG. 2. A chromaticity test 202 discards, with high confidence, non-skin-color pixels for the input color image. Chromaticity test 202 is different from conventional skin color detection methods used in face detection. In the past, in using color properties for face detection, most skin color detection techniques employed carefully designed skin color models in order to achieve high skin detection accuracy with very low false positives. However, skin color models having a high degree of accuracy often tended to exclude skin colors falling outside of the skin color region of a majority population upon which the skin color models were built. The exclusion of non-majority skin colors, in turn, results in face detection failures. The chromaticity test 202 in this design, instead, focuses on exclusion of non-skin-colors with high accuracy. For example, it discards saturated green, or saturated blue pixels (sets pixels to zero), and keeps pixels having colors close to skin-colors. Therefore, it does retain most skin color pixels of non-majority populations.

Following the chromaticity test 202 is a geometry (or shape analysis) test 204. Pixels retained in the chromaticity test 202 are grouped into regions (or clusters of pixels). These regions are checked to see if they pass a geometry test. The geometry test 204, basically, checks a region's geometry shape, size, and location. Only those regions that pass the geometry test 204 will be allowed to enter a subsequent statistical test, that is, a grid pattern test 206. All pixels in regions failing the geometry test 204 are set to zero.

After completion of the first two tests (chromaticity test 202 and geometry test 204), regions (or clusters of pixels) possibly containing faces still remain and are further checked to locate approximate positions of faces. Localization of face candidates is performed by the grid pattern test 206 with the help of a mean grid pattern element (MGPe) image. The mean grid pattern element (MGPe) image is obtained in a step of Training 210. The grid pattern test 206 simply conducts a similarity check by evaluating a correlation coefficient between the MGPe image and a grid pattern element (GPe) image converted from a sub-image that is cropped from the remaining regions obtained from the geometry test step. Sub-images that pass the grid pattern test 206 are marked as face candidates.

All face candidates are subsequently checked in a location test 208. Face candidates having a large portion residing in zero valued regions that were set in the geometry test 204 operation are unmarked in the location test 208 operation. Also, because the grid pattern test 206 is performed on the image in a raster scan fashion, it may result in multiple face candidates positioned very close to each other for the same face. A merge process is then performed to combine closely spaced multiple face candidates into a single face candidate based on a distance measure.

Complete details of the face localization algorithm currently used can be found in the co-pending U.S. patent application Ser. No. 10/211,011. Face detection also can be accomplished using other methods.

Eye Detection

Figure 3:
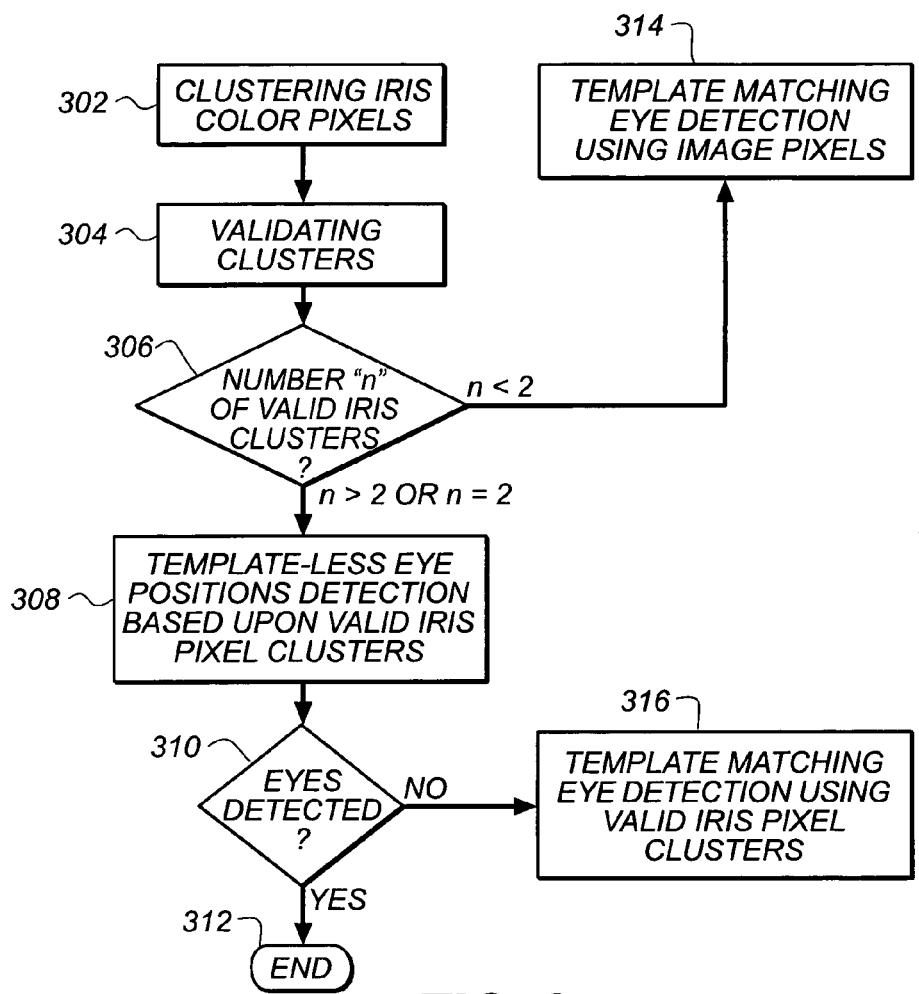
FIG. 3 is a flowchart illustrating the eye detection method of the present invention.

An eye detection process 404, depicted in FIG. 3, is conducted on the face region found in face detection operation 402. The current eye detection 404 adopts a method of Bayesian Iris-Based Multi-Modal Eye Localization described in the co-pending U.S. Patent Publication No. 2002/0114495 A1. Here is a brief summary of the detection operations.

Referring to FIG. 3, the flowchart of operations of the eye localization or eye detection process 404 is depicted in FIG. 3. A cluster generated in an operation of Clustering Iris Color Pixels 302 is a non-empty set of iris color pixels with the property that any pixel within the cluster is also within a predefined distance to another pixel in the cluster. Clusters are checked in an operation of Validating clusters 304. A cluster may be invalid because, for example, it may contain too many iris color pixels or because of its geometric properties. Invalid iris pixel clusters are removed from further consideration. If the number of valid iris color clusters "n" is at least two in an operation of query 306, then the process branches to an operation of "Template-less Eye Detection" 308 to find a pair of eyes. In operation 308, geometric reasoning is employed to detect eyes based on the geometric relationship between the iris pixel clusters.

If the template-less eye detection operation 308 finds a pair of eyes checked in a query operation 310, then the process ends at an end operation 312. When the template-less eye detection operation 308 cannot determine a winning pair of eyes based on the geometry relationship checked in the query operation 310, then the process goes to an operation of "Template matching eye detection using valid iris clusters" 316. When no iris clusters are identified (checked in the query operation 306), the process goes to an operation of "Template matching eye detection using image pixels" 314. In the template matching case, there always exists a pair of eye candidates using the minimum SSD criterion. Geometry relationship validation is still needed to make a final decision.

The purpose of eye detection process 404 is to use a distance between two eyes as a precise reference measurement to deduce sizes of other body parts based on the statistical information provided in Tilley's paper. Certainly, the eye detection operation can be replaced by other facial feature finding schemes.

Intelligent Scissors

Figure 6:
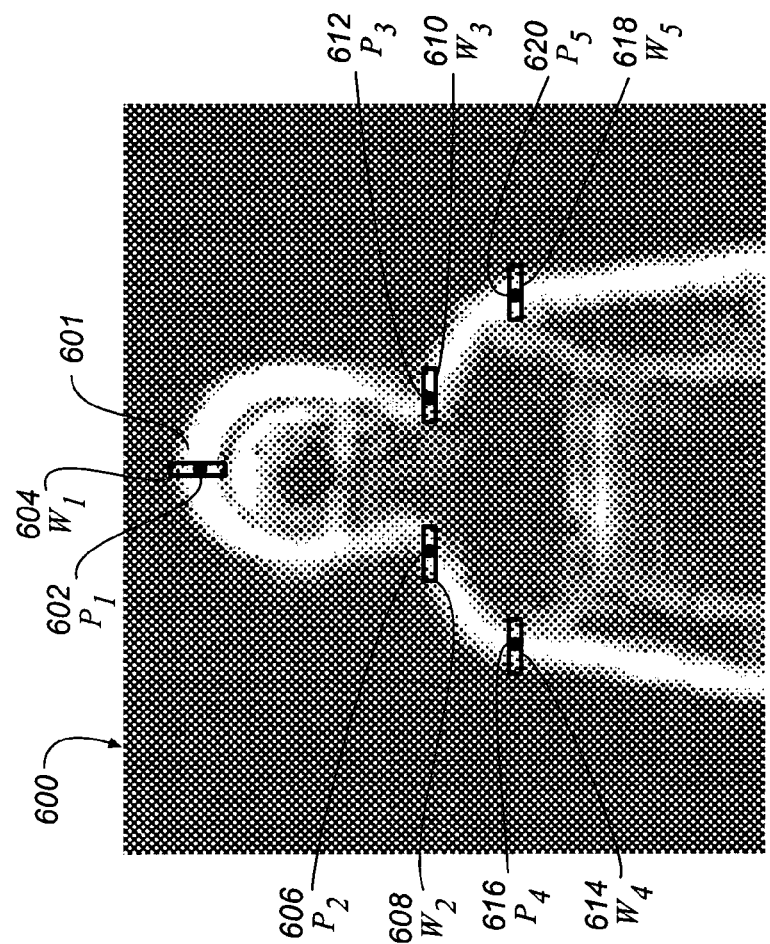
FIG. 6 is an illustration of a cost map along with search windows for searching seed and target pixel pairs according the present invention.

In the original design by E. N. Mortensen, and W. A. Barrett, the Intelligent Scissors system has an interface that lets a user specify two pixels in an image, namely a seed point and a target point along an object's boundary. Then the system will try to find a cost-minimized path from the seed point to the target point. To find such a path, the image is first modeled as a graph. Every pixel in the image is converted to a node in the graph. Every node is then connected to its eight neighbors by links. Each link is associated with a cost. The cost value is determined by a cost function that is usually related to edge features. Links to pixels with strong edge features are associated with a low cost, and links to pixels with weak edge features are associated with a high cost. To start path searching, the system needs to build an initial cost map in an operation of Cost Map Generator 408 in FIG. 4. The initial cost map contains the cost associated with each link between any two 8-neighbors in the image. An exemplary cost map 600 is shown in FIG. 6. The features used in computing the cost map are as follows:

Laplacian zero-crossing $Z(r)$
Gradient magnitude $G(r)$
Gradient direction $D(q,r)$ The cost function, $cst(q,r)$, between neighboring pixels, q and r, is computed as $$cst(q,r) = w_Z f_Z(Z(r)) + w_D f_D(D(q,r)) + w_G f_G(G(r)) \quad \text{Equation 1}$$

where $f_Z(\bullet)$ is a function related to zero-crossing feature, $f_G(\bullet)$ is a function related to gradient feature, $f_D(\bullet)$ is a function related to gradient direction feature, $w_Z$, $w_D$ and $w_G$ are user defined weights.

Once this cost map is built, a dynamic-programming path search algorithm similar to Dijkstra's algorithm (see "A Note on Two Problems in Connection with Graphs," by E. W. Dijkstra, *Numeriche Mathematik*, vol. 1, pp. 269-270, 1959) is used to search for the optimal path from the seed to every single pixel, including the target pixel, in the image. Specifically, each pixel is given a pointer to the next pixel along the path.

However, it is not necessary to search for the optimal path from the seed to every single pixel in the image, if a pair of seed and target pixels are given. A modified approach in the present invention is to define a search band based on the location of the seed and target pixels. This search band is very similar to the rubber-band recently reported in a publication that proposed an improved Intelligent Scissors graph search algorithm in "Rubberband: An Improved Graph Search Algorithm for Interactive Object Segmentation," by Huitao Luo et al., *Proc. of ICIP*, 2002. The modified algorithm in the present invention is summarized as following:

Input:
s is a seed point
t is a target point
Data and functions:
L is a rank (cost) ordered list of active nodes
e(q) indicates whether node q has been expanded
T(q) returns a total cost from q to the seed point
cst(q,r) returns a cost between two neighboring pixels q and r
min(L) returns and removes a node with the lowest cost among nodes in list L
SetSearchBand(s,t) sets a search band based on the current seed and target points
N(q) returns up to 8 neighbors of q within the boundary set by SetBoundary(s,t)
AddtoL(r) adds r to L at a proper position based on a cost associated with r
Output:
B(r) contains pointers from r indicating a minimum cost path to s

```
Algorithm:
    T(s) ← 0;
    L ← s;
    SetSearchBand(s,t);
    While (L ≠ empty)
        q ← min(L);
        e(q) ← true;
        For each r ∈ N(q) such that e(r) == false do
            c ← T(q) + cst(q,r);
            If r ∉ L then
                T(r) ← c;
                AddtoL(r);
                B(r) ← q;
            Else If r ∈ L and c < T(r) then
                Erase r;
                T(r) ← c;
                AddtoL(r);
                B(r) ← q;
            End
        End
    End
    Return B(t).
```

The function SetSearchBand(s,t) generates a rectangular region around the seed and target pixels. An implementation of this function can be expressed as $$\delta r = abs(r_s - r_t);$$

$$\delta c = abs(c_s - c_t);$$

If $(\delta r > \delta c)$ $$r_{upper} = \max(0, \min(r_s, r_t) - r_f/f_r);$$

$$r_{lower} = \min(r_I - 1, \max(r_s, r_t) + r_f/f_r);$$

$$c_{left} = \max(0, \min(c_s, c_t) - \delta r/f_r);$$

$$c_{right} = \min(I_c, \max(c_s, c_t) + \delta r/f_r);$$

Else if $(\delta c > \delta r)$ $$r_{upper} = \max(0, \min(r_s, r_t) - \delta c/f_c);$$

$$r_{lower} = \min(r_I - 1, \max(r_s, r_t) + \delta c/f_c);$$

$$c_{left} = \max(0, \min(c_s, c_t) - c_f/f_c);$$

$$c_{right} = \min(I_c, \max(c_s, c_t) + c_f/f_c)$$

Else $r_{upper}$=max(0,min($r_s,r_t$)-δc/$f_c$);

$r_{lower}$=min($r_f$-1,max($r_s, r_t$)+δc/$f_c$);

$c_{left}$=max(0,min($c_s,c_t$)-δr/$f_r$);

$c_{right}$=min($I_c$,max($c_s,c_t$)+δr/$f_r$);

End where $r_s$ is a row coordinate of the seed pixel, $c_s$ is a column coordinate of the seed pixel, $r_t$ is a row coordinate of the target pixel, $c_t$ is a column coordinate of the target pixel, abs(x) returns an absolute value of x, $f_r$ is a constant, $f_c$ is a constant, δr is a positive disparity between the seed and target row coordinates, δc is a positive disparity between the seed and target column coordinates, min(x,y) returns a minimum of x and y, and max(x,y) returns a maximum of x and y. An exemplary value for $f_r$ is 10, an exemplary value for $f_c$ is 10.

The modified algorithm calculates a minimum cost path from each pixel within the band to the seed, starting from the seed itself (zero cost). Once these short paths near the seed are established, pixels that are farther and farther away from the seed are added on to paths which are already known to be optimal. A minimum-cost unexpanded pixel (node q in the above algorithm summary) is always guaranteed to have an optimal path, so by always choosing to expand this pixel next, the algorithm is guaranteed to only find optimal paths. A minimum cost path from target t to the seed is stored in B(t). It should be noted that no path can start at the seed and go all the way around the object, back to the seed. This is because such a path would necessarily have a higher cost than the path including only the seed, as costs are always positive.

In the original Intelligent Scissors design the seed and target points are selected, interactively, by the user. In this automatic human figure contour outlining system the seed and target points are generated by a system, which will be described next.

System Operation

A flowchart 400 for automatic human figure contour outlining is depicted in FIG. 4. A face detection process 402 which is described in FIG. 2 is applied to an incoming image to find a face region. The parameters of the face region are then used in the eye detection process 404 to locate the center between two eyes.

Figure 5:
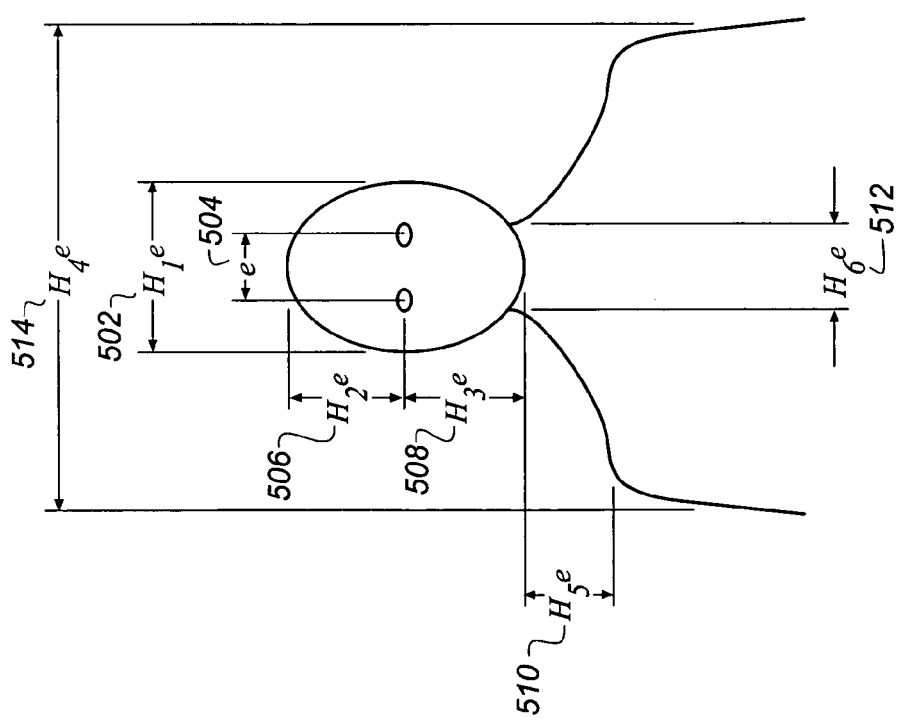
FIG. 5 is an illustration of several parameters for the people detection method according to the present invention.

The current flowchart 400 is designed to detect people that are upright in photo images. It is understood that the system can be modified to detect people in different postures. For the upright posture, a distance, e (504) (shown in FIG. 5), between the two eyes found in the eye detection process 404 is used as a reference unit for computing other key body measurements, for example, $H_1$e (502) through $H_6$e (512), shown in FIG. 5. The coefficients, $H_1$ through $H_6$, can be calculated with the help of the statistics of human body measurements given in Tilley's paper. Exemplary values for these coefficients are the following: $H_1$=2.58, $H_2$=1.87, $H_3$=1.8, $H_4$=7.7, $H_5$=1.56, and $H_6$=1.8. Once the distance between two eyes and positions of two eyes are determined, positions and sizes of different upper body parts can be estimated in operation of people detection 406 (FIG. 4) using the coefficients given above.

The information about body part locations is then used in a seed and target point generator 410 to produce a set of seed-target pixel pairs. It is understood that in order to use the Intelligent Scissors to accurately outline the body contour, these seed and target pixel pairs must be on or very close to edges of body parts captured in an image.

Recall that in Equation 1 one of the components of the cost function is related to edge features. Strong edge features translate to low cost. In one embodiment of the present invention, a cost map of the image is computed in a cost map generator operation 408 in FIG. 4. The cost map is then fed to operation seed/target pixel pairs generator 410.

The next operation is to find M key human figure contour points with M search windows. The exemplary cost map 600 is shown in FIG. 6 where five exemplary search windows for locating seed and target pixel pairs are also displayed. Note that brighter pixels indicate lower cost. Locations of search windows can be determined using the information obtained in the operation of people detection 406. For example, using the known eye vertical position (from the eye detection operation) and the coefficient $H_2$, the vertical position of a top of a head 601 can be computed. A horizontal position of the top of head 601 is at a middle position of the corresponding pair of eyes. A center of window $W_1$ (604) can be located at the top of head 601. A width of $W_1$ could be chosen as an exemplary value of 1 (pixel). The height of $W_1$ could be equal to, for example, the length of the distance, e (504), between the two eyes. Then there will be e number of cost map pixels in window $W_1$ (604) of this example. Once the size and position for window $W_1$ (604) are determined, within the window, collect N pixels with lowest cost values among the e pixels. An exemplary value currently used for N is 4. An exemplary minimum value for e is 14. The average vertical and horizontal positions of these N pixels are used to determine the key human figure contour points, $P_1$ (602), shown in FIG. 6. $P_1$ (602) will be used as a seed or a target point.

Similarly, the positions of windows $W_2$ (608) and $W_3$ (610) can be determined using the known vertical eye position, the middle position of the two eyes, the value e, and coefficients $H_3$ (508) and $H_6$ (512). Windows $W_4$ (614) and $W_5$ (618) can be determined using the known vertical eye position, the middle position of the two eyes, the value e, and coefficients $H_3$ (508), $H_5$ (510) and $H_4$ (514). An exemplary width for windows $W_2$ (608), $W_3$ (610), $W_4$ (614), and $W_5$ (618) is e (pixels). An exemplary height for windows $W_2$ (608), $W_3$ (610), $W_4$ (614), and $W_5$ (618) is one (pixel). Once the position and size are determined for these windows, positions of the other key human figure contour points $P_2$ (606), $P_3$ (612), $P_4$ (616), and $P_5$ (620) can be computed with the same method used in computing the position for point $P_1$ (602).

In theory, once the points $P_1$ (602), $P_2$ (606), $P_3$ (612), $P_4$ (616), and $P_5$ (620) are found, any two of them can be grouped to form a seed and target pixel pair. In practice, an exemplary set of pairs could be the following:

{($P_1,P_2$);
($P_2,P_4$);
($P_1,P_3$);
($P_3,P_5$)}.

The first element in the above pairs is the seed point, the second element is the target point.

Note that more seed and target points further down can be found with the similar approach using the data associated with the two eyes and the statistics provided in Tilley's paper.

The cost map generated in the operation of Cost Map Generator 408 is also fed into the Human Figure Outlining operation 412 to compute cst(q,r), then to find the body contour using the set of seed and target points determined above.

In the current implementation the weights in Equation 1 are selected as $w_Z=0$, $w_D=0$, and $w_G=1$; and the function $f_G(\cdot)$ is computed as $$f_G(G(r)) = \left(1 - G(r) \Big/ \operatorname*{Max}_q(G(q))\right),$$

where $$\operatorname*{Max}_q(G(q))$$

finds a maximum gradient magnitude in the image.

The invention has been described with reference to one or more embodiments. However, it will be appreciated that variations and modifications can be effected by a person of ordinary skill in the art without departing from the scope of the invention.

Parts List 100 image source
102 image processor
104 image display
106 operator interface
107 computer readable storage medium
108 operator interface
109 output device
200 face candidate finding method flowchart
202 chromaticity test
204 geometry test
206 grid pattern test
208 location test/merging
210 training
302 clustering iris color pixels
304 validating clusters
306 query
308 template-less eye positions detection
310 query
312 end
314 template matching eye detection using image pixels
316 template matching eye detection using valid iris pixel clusters
400 human figure contour outlining method flowchart
402 face detection
404 eye detection
406 people detection
408 cost map generator
410 seed/Target pairs generator
412 human figure outlining
502 body measurement $H_1e$

Parts List—Continued 504 distance e
506 body measurement $H_2e$
508 body measurement $H_3e$
510 body measurement $H_5e$
512 body measurement $H_6e$
514 body measurement $H_4e$
600 cost map
601 top of head
602 human figure contour point $P_1$
604 center window $W_1$
606 human figure contour point $P_2$
608 window $W_2$
610 window $W_3$
612 human figure contour point $P_3$
614 window $W_4$
616 human figure contour point $P_4$
618 window $W_5$
620 human figure contour point $P_5$
700 general figure contour outlining method flowchart
702 region parameter test
704 characteristic feature determination
706 figure detection
708 information map generator
710 seed/target pixel pairs generator
712 figure outlining

What is claimed is:

1. A digital image processing method for automatically outlining a contour of the figure of a human body in a digital image, comprising the steps of:
   a) testing parameters of a region within the digital image according to a plurality of cascaded tests;
   b) determining whether the region contains characteristic features of the human body figure within the digital image;
   c) computing location parameters of the characteristic features in the region for the figure of a human body within the digital image, where the region is related to the human body figure;
   d) determining boundary parameters for the figure of a human body corresponding to the location parameters of the characteristic features in the region;
   e) computing an information map of the digital image;
   f) computing a set of indicative pixels for the contour of the figure of a human body; and
   g) automatically outlining the contour of the human body figure using the set of indicative pixels, the information map, and a contour outlining tool.

2. The method claimed in claim 1, wherein the step of computing a set of indicative pixels for the contour of the figure of a human body, includes the steps of:
   f1) locating M search windows using relevant body measurements in a cost map for computing the set of indicative pixels for contour of the human body figure;
   f2) collecting N cost map pixels with low cost values for each window;
   f3) computing the location of a relevant human body figure contour point which is the statistical average location of the N pixels in each of the windows; and
   f4) organizing computed relevant human body figure contour points, from each of the windows, as seed and target pixel pairs.

3. The method claimed in claim 2, wherein the step of automatically outlining the contour of the human body figure using the set of indicative pixels and the contour outlining tool, includes the steps of:
   g1) automatically generating pairs of pixels as seed and target end points, respectively, from the cost map, and;
   g2) dynamically searching with the contour outlining tool to find an optimal path, relative to the cost map, from the seed to the target end points.

4. The method claimed in claim 1, wherein the contour outlining tool is a modified non-parametric boundary finding algorithm.

5. The method claimed in claim 1, wherein the step of computing an information map of the digital image further comprises employing intensity values of the digital image to generate a cost map.

6. The method claimed in claim 5, wherein the intensity values of the digital image are used to find edges of the digital image for generating the cost map.

7. The method claimed in claim 4, wherein the modified non-parametric boundary finding algorithm finds cost-minimized paths between a plurality of seed and target pixel pairs along the contour of the human body figure.

8. A digital image processing method for automatically outlining a contour of a human body figure in a digital image, comprising the steps of:
   a) finding parameters of a facial region, corresponding to the human body figure within the digital image, according to a plurality of cascaded tests;
   b) determining whether the facial region contains characteristic features of the human body figure within the digital image;
   c) computing location parameters of the characteristic features in the facial region for the human body figure within the digital image;
   d) determining boundary parameters for the human body figure corresponding to the location parameters of the characteristic features in the facial region;
   e) computing an information map of the digital image;
   f) computing a set of indicative pixels for the contour of the human body figure; and
   g) automatically outlining the contour of the human body figure using the set of indicative pixels, the information map, and a contour outlining tool.

9. The method claimed in claim 8, wherein the step of finding parameters of the facial region of the human body figure in the digital image employs a face detection algorithm.

10. The method claimed in claim 8, wherein the step of computing location parameters of the characteristic features in the facial region employs an eye detection algorithm.

11. The method claimed in claim 8, wherein the step of computing an information map of the digital image computes a cost map.

12. The method claimed in claim 10, wherein the step of determining boundary parameters for the figure of a human body computes statistically relevant body measurements of the human body figure corresponding to locations of two eyes in the facial region.

13. The method claimed in claim 12, wherein the step of computing a set of indicative pixels for contour of the human body figure, includes the steps of:
   f1) locating M search windows using relevant body measurements in a cost map for computing the set of indicative pixels for contour of the human body figure;
   f2) collecting N cost map pixels with low cost values for each window;
   f3) computing a location of a relevant human body figure contour point which is the statistical average location of the N pixels in each of the windows; and
   f4) organizing computed relevant human body figure contour points, from each of the windows, as seed and target pixel pairs.

14. The method claimed in claim 13, wherein the step of automatically outlining the contour of the human body figure using the set of indicative pixels and the contour outlining tool, includes the steps of:
   g1) automatically generating pairs of pixels as seed and target end points, respectively, from the cost map; and
   g2) dynamically searching with the contour outlining tool to find an optimal path, relative to the cost map, from the seed to the target end points.

15. The method claimed in claim 8, wherein the contour outlining tool is a modified non-parametric boundary finding algorithm.

16. The method claimed in claim 8, wherein the step of computing an information map of the digital image further comprises employing intensity values of the digital image to generate a cost map.

17. The method claimed in claim 16, wherein the intensity values of the digital image are used to find edges of the digital image for generating the cost map.

18. The method claimed in claim 15, wherein the modified non-parametric boundary finding algorithm finds cost-minimized paths between a plurality of seed and target pixel pairs along the contour of the human body figure.

19. The method claimed in claim 9, wherein the face detection algorithm includes cascading a plurality of tests selected from the group consisting of: a chromaticity test, a geometry test, a grid pattern test, a location test, and a merging process.

20. The method claimed in claim 10, wherein the eye detection algorithm includes the steps of:
   a) clustering iris colored pixels as iris clusters;
   b) validating the iris clusters;
   c) counting the number of valid iris clusters as "n", where "n"<2, employing template matching eye detection using image pixels;
   d) where "n"≧2, employing template-less eye detection corresponding to the valid iris clusters;
   e) determining whether eyes are detected; and
   f) employing template matching eye detection corresponding to the valid iris clusters, when the template-less eye detection is unable to find a pair of eyes.

21. A digital image processing system for automatically outlining a contour of a human body figure in a digital image, comprising:
   a) means for testing parameters of a region within the digital image according to a plurality of cascaded tests;
   b) means for determining whether the region contains characteristic features of the human body figure within the digital image;
   c) means for computing location parameters of the characteristic features in the region for the human body figure within the digital image;
   d) means for determining boundary parameters for the human body figure corresponding to the location parameters of the characteristic features in the region;
   e) means for computing an information map of the digital image;
   f) means for computing a set of indicative pixels for the contour of the human body figure; and
   g) means for automatically outlining the contour of the human body figure using the set of indicative pixels, the information map, and a contour outlining tool.

22. The system claimed in claim 21, wherein the means for testing parameters of the region of the human body figure in the digital image employs a face detection algorithm.

23. The system claimed in claim 21, wherein the means for computing location parameters of the characteristic features of the human body figure in the region within the digital image employs an eye detection algorithm.

24. The system claimed in claim 21, wherein the means for computing an information map of the digital image computes a cost map.

25. The system claimed in claim 21, wherein the means for determining boundary parameters for the human body figure computes statistically relevant body measurements of the human body figure corresponding to the location parameters of the characteristic features in the region.

26. A contoured digital image of a human body figure outlined according to the method of claim 1.

27. A contoured digital image of a human body figure outlined according to the method of claim 8.

28. A contour outlining tool for automatically outlining a contour of a human body figure within a digital image, in combination with a set of indicative pixels, comprising:
   a) a detector that tests parameters of a region within the digital image according to a plurality of cascaded tests;
   b) a first analyzer that determines whether the region contains characteristic features of the human body figure within the digital image;
   c) a location processor that computes location parameters of the characteristic features in the region for the human body figure within the digital image;
   d) a second analyzer that determines boundary parameters for the human body figure corresponding to the location parameters of the characteristic features in the region;
   e) a mapping generator that generates an information map of the digital image relative to the boundary parameters of the human body figure; and
   f) a pixel generator that generates the set of indicative pixels for the contour of the figure.

29. The contour outlining tool claimed in claim 28, wherein the detector for testing parameters of the region of the human body figure in the digital image employs a face detection algorithm.

30. The contour outlining tool claimed in claim 28, wherein the location processor for computing location parameters of the characteristic features of the human body figure in the region within the digital image employs an eye detection algorithm.

31. The contour outlining tool claimed in claim 28, wherein the mapping generator for generating an information map of the digital image computes a cost map.

32. The contour outlining tool claimed in claim 28, wherein the second analyzer for determining boundary parameters for the human body figure computes statistically relevant body measurements of the human body figure corresponding to the location parameters of the characteristic features in the region.

33. A contour outlining tool for automatically outlining a contour of a human body figure in a digital image, comprising:
   a) a face detector that tests parameters of a facial region, corresponding to the human body figure within the digital image, according to a plurality of cascaded tests;
   b) a first analyzer that determines whether the facial region contains characteristic features of the human body figure within the digital image;
   c) a location processor that computes location parameters of the characteristic features in the facial region for the human body figure within the digital image;
   d) a second analyzer that determines boundary parameters for the human body figure corresponding to the location parameters of the characteristic features in the facial region;
   e) a map generator that generates an information map of the digital image relative to the boundary parameters of the human body figure; and
   f) a pixel generator that generates a set of indicative pixels for the contour of the human body figure.

34. The contour outlining tool claimed in claim 33, wherein the face detector employs a face detection algorithm.

35. The contour outlining tool claimed in claim 33, wherein the location processor for computing location parameters of the characteristic features in the facial region employs an eye detection algorithm.

36. The contour outlining tool claimed in claim 33, wherein the map generator computes a cost map.

37. The contour outlining tool claimed in claim 35, wherein the second analyzer for determining boundary parameters for the human body figure computes statistically relevant body measurements of the human body figure corresponding to location of two eyes in the facial region.

38. The contour outlining tool claimed in claim 33, further comprising a modified non-parametric boundary finding algorithm that finds cost-minimized paths between a plurality of seed and target pixel pairs along the contour of the human body figure.

\* \* \* \* \*